Aug. 14, 1956         H. WOLTER         2,759,106
          OPTICAL IMAGE-FORMING MIRROR SYSTEM PROVIDING
Filed May 20, 1952    FOR GRAZING INCIDENCE OF RAYS
                                        2 Sheets-Sheet 1
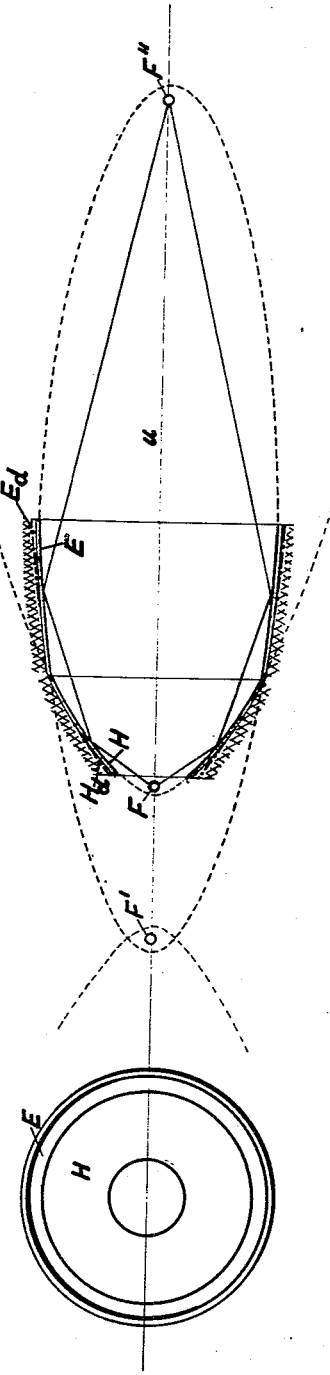
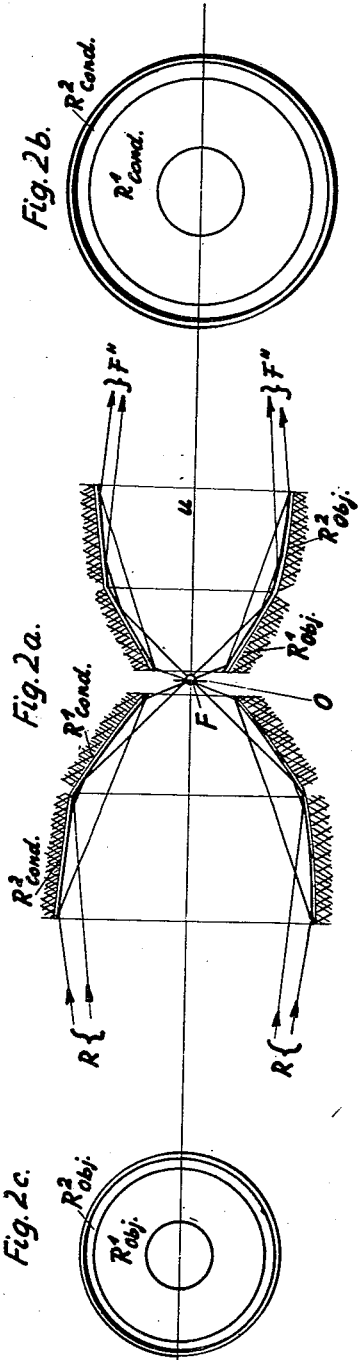
Inventor:
Hans Wolter
By
       Atty.

Aug. 14, 1956  H. WOLTER  2,759,106
OPTICAL IMAGE-FORMING MIRROR SYSTEM PROVIDING
FOR GRAZING INCIDENCE OF RAYS
Filed May 20, 1952  2 Sheets-Sheet 2
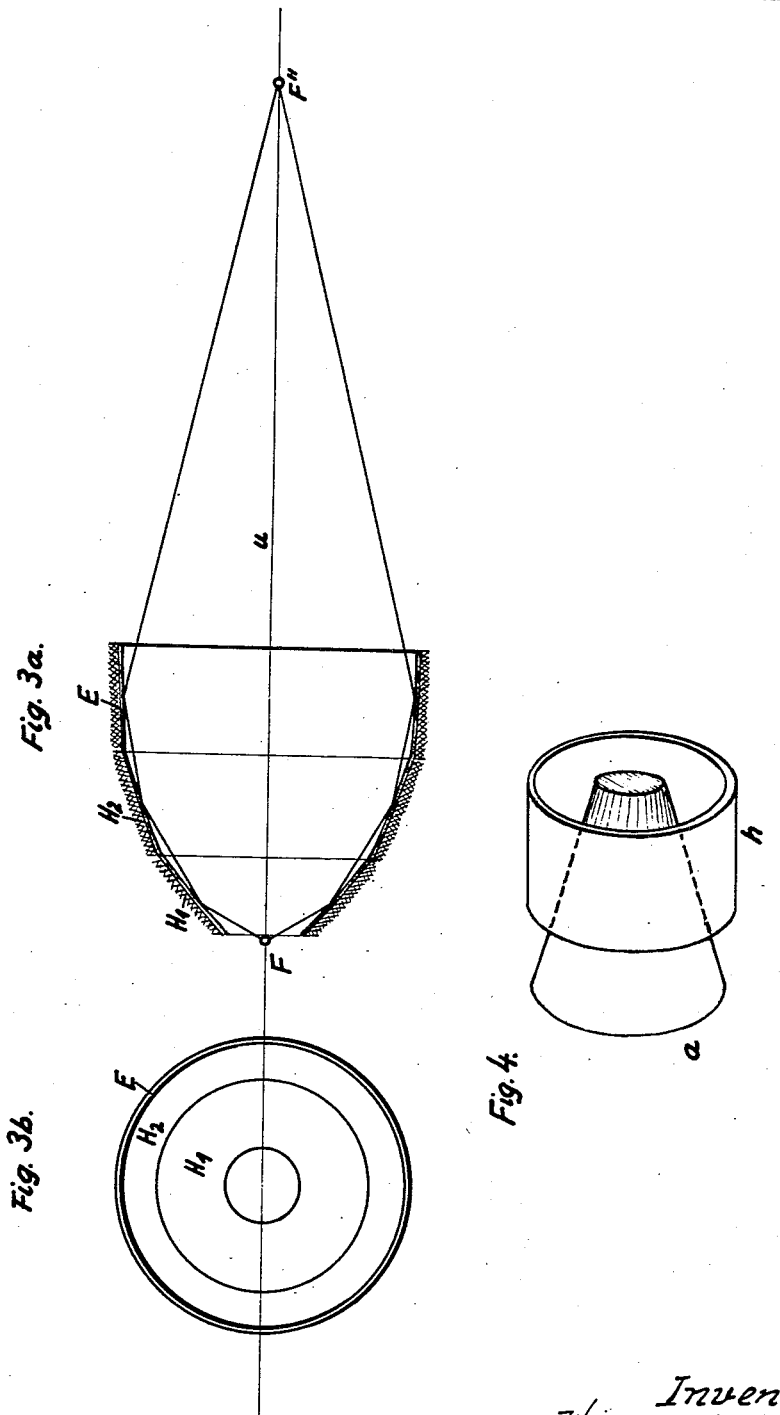
Inventor:
Hans Wolter
By
Att'y

United States Patent Office 2,759,106
Patented Aug. 14, 1956

2,759,106

OPTICAL IMAGE-FORMING MIRROR SYSTEM PROVIDING FOR GRAZING INCIDENCE OF RAYS

Hans Wolter, Kiel, Germany

Application May 20, 1952, Serial No. 288,935

Claims priority, application Germany May 25, 1951

12 Claims. (Cl. 250—53)

This invention is concerned with an image-forming mirror system providing for nearly grazing incidence of rays, especially X-rays, for use, for example, in X-ray microscopy.

The construction of an X-ray microscope failed in the past, essentially due to the lack of suitable optics. All known materials reflect X-rays only by very small angles, and optics making use of such reflection seem for successful use practically unsuitable.

Much more promising would appear the attempt to develop a pure mirror optics, because X-rays projected through air or through a vacuum are subject to total reflection incident upon the reflecting surfaces of various materials, for example, vitreous materials, metals or salts. Such total reflection occurs only for rays incident upon reflecting surfaces at a very small grazing angle, and the angles of incidence which are available differ, in the case of soft X-rays, only by a very few degrees and, in the case of hard X-rays, by arc-minutes of ninety degrees.

The suggestion has been made to utilize this total reflection in the construction of an image-forming optics consisting of two concave mirrors with their axes disposed substantially perpendicular to each other. The formation of the image is in such structures extraordinarily wanting. It seems that no calculations had been made concerning the optical properties of the system, for example, concerning the satisfaction of Abbe's sine condition.

The present invention proposes a mirror system employing axially successively disposed reflecting surfaces having a common axis, such surfaces being struck by rays at nearly grazing incidence and yet providing for very good approximation of Abbe's sine condition.

The invention will be explained with reference to the drawings, wherein

Fig. 1a shows a longitudinal sectional view of an example of the new image-forming mirror system;

Fig. 1b shows an end view of Fig. 1a;

Fig. 2a illustrates a longitudinal sectional view of an arrangement according to the invention comprising two mirror systems, one of the systems serving as a condenser and the other serving as an objective for X-rays;

Fig. 2b is an end view of the condenser of Fig. 2a;

Fig. 2c represents in similar manner and end view of the objective of Fig. 2a;

Fig. 3a shows a mirror system according to the invention comprising three serially related individual mirrors;

Fig. 3b is an end view of the system of Fig. 3a; and

Fig. 4 illustrates in diagrammatic perspective manner an X-ray source for use with the mirror system made according to the invention.

The abscissa is shown in Figs. 1a, 2a and 3a considerably extended so as to make the ordinates clearer. The pronounced eccentricity of the rotation surfaces necessary for satisfying the conditions for grazing incidence of the rays therefore does not appear in its true magnitude. If it were attempted to reproduce the true conditions in the drawings, the intersecting curves of the rotation bodies would appear in the immediate vicinity of the axes $u$ and it would be very difficult to illustrate with sufficient clarity the path of the rays.

For convenience and clarity of representation, the abscissas have been shown in Figs. 1a, 2a and 3a on a considerably smaller scale than the ordinates. The reflecting surfaces are preferably mutually so related that the focal point F' of the rotation ellipsoid E forms at the same time the rearward focal point of the rotation hyperboloid H.

Fig. 1a represents the entire path of the intersecting curves of the rotation surfaces in a plane through the rotation axis. The parts which are not utilized for reflection are cross-hatched and the reflecting parts are shown in full lines. It will be clearly seen that the points F' and F are the two focal points of the hyperboloid, F' being the rearward focal point mentioned before. The points F' and F'' are the two focal points of the ellipsoid.

The rays projected from the second focal point F of the rotation hyperboloid are reflected, first, on the hyperboloid H and then on the ellipsoid E in such a manner, that they are aimed unto the focal point F'' of the ellipsoid.

The ellipsoid E may also degenerate to a paraboloid. The focal point F' will then be preserved, while the focal point F'' will project to infinity along the axis $u$. The X-rays emanating from the focal point F and being reflected, first, along the hyperboloid and then along the paraboloid, project in such case to infinity along paths extending in parallel with the axis $u$.

The above described arrangement may be considered in a case where it is desired to produce rays emanating from a focal point to extend axis-parallel, or in a case where it is desired to unite axis-parallel rays at a focal point. Such requirement may be fulfilled, for example, by a condenser.

Abbe's sine condition may be particularly well satisfied with co-focal arrangement and great eccentricity (great abcissa values with small ordinate values) of the rotation surfaces. Such an arrangement will insure that every small surface element at F, which is oriented perpendicular to the axis, is reproduced at F'' in the form of a similar element perpendicular to the axis.

It is of advantage in mirror systems having two reflecting rotation surfaces to determine the form thereof so as to reduce image faults as much as possible. Among such systems may be mentioned aplanatic systems, an example of which is disclosed in copending application Ser. No. 288,910, filed May 20, 1952.

By starting from two second-degree rotation surfaces, as indicated in Figs. 1a and 1b, it is possible to further reduce image faults within a circular area of the image plane by somewhat deforming one of the two surfaces. The image faults in the immediate vicinity of the axis are thereby necessarily somewhat magnified; particularly, the axis point is extended to a dispersed circle. However, since a certain indistinctness is in view of the diffraction unavoidable, the aforementioned reduction of greater image faults with coincident magnification of small faults will provide for an equalization or compensation, and all faults will remain tolerable within the relatively large viewing field.

Still more perfect images may be obtained by deformation of both surfaces. The alterations of the form of the reflecting surfaces which are obtained by such deformation are indicated in Fig. 1a by dot-dash lines $H_d$ and $E_d$, in somewhat exaggerated manner, so as to bring them out more clearly. Such deformation also makes it possible to obtain strictly aplanatic mirror systems of grazing reflection, which secure freedom of spherical aberration upon the axis as well as the strict fulfillment of the sine condition. In the case of great image-spacing (as compared with the focal distance), the meridian curves of two mirrors may be expressed by the parameter representation:

Mirror I:

$$u_1 = -D + \frac{f^2}{4D} \sin^2 \alpha + g \cos^4 \frac{\alpha}{2}\left(\frac{1}{k} tg^2 \frac{\alpha}{2} - 1\right)^{1-k}; \quad y_1 = f \sin \alpha$$

Mirror II:

$u_2 = d \cos \alpha; \quad y_2 = d \sin \alpha$, together with $$k = \frac{D}{f-D} \quad \text{and} \quad \frac{1}{d} = \frac{1-\cos \alpha}{2D} + \frac{1+\cos \alpha}{2g}\left(\frac{1}{k} tg^2 \frac{\alpha}{2} - 1\right)^{1+k}$$

In these expressions, $\alpha$ is the parameter; $u_1$ the abscissa (measured in the direction of the optical system axis); and $y_1$ Carte's ordinate for the meridian curve of the mirror I. References $u_2$ and $y_2$ have corresponding significance for the mirror II. $D$ and $g$ are selectable real or complex constants; $f$ is the focal distance. The following values were obtained in the examples noted below:

Example 1:

$f = 4014; \quad D = 13.8; \quad g = 1450$

Example 2:

$f = 4014; \quad D = 14; \quad g = 1600$

Example 3:

$$f = 1000; \quad D = 1; \quad g = 500 \cdot e^{-i\pi\frac{998}{999}}$$

Example 4:

$$f = 1000; \quad D = 10; \quad g = 500 \cdot e^{-i\pi\frac{980}{990}}$$

Example 5:

$$f = 1000; \quad D = 100; \quad g = 10000 \cdot e^{-i\pi\frac{800}{900}}$$

Example 6:

$$f = 1000; \quad D = 40; \quad g = 25000 \cdot e^{-i\pi\frac{920}{960}}$$

Strictly aplanatic mirror systems produce in the vicinity of the axis particularly small image faults; their surfaces deviate usually very little from second-degree planes. An equalization between marginal and central image distortion may be obtained by favorable selection regarding the position of the object plane or the image plane.

Good image quality may also be obtained by the use of three or, still better, four axially successively disposed rotation surfaces. An example is shown in Fig. 3a and 3b, in which the two inner surfaces $H_1$ and $H_2$ are approximated rotation hyperboloids and the outer surface E is approximately a rotation ellipsoid.

If more than two reflecting rotation surfaces are used, they are suitably arranged along the axis in such a manner that two serially successive rotation surfaces have one focal or developed point approximately in common. In such co-focal arrangement, one focal point of the first and the last rotation surfaces will always determine the position of the object and of the image; the position of the object being thereby determined by the focal point of the first rotation surface, which does not coincide with a focal point of the second rotation surface, and the position of the image being determined by the focal point of the last rotation surface which does not coincide with a focal point of the one-before-last rotation surface. As is commonly known, the object and the image will in such arrangement exchange positions upon reversal of the ray path.

An X-ray microscope may be realized with such a mirror optics by disposing at F the object of which an image is to be formed. The screen or photographic plate or film, respectively, is then arranged at F''. The illumination of the object in approximation to the properties of the optics is suitably cone-shaped. The manner in which this may be accomplished is apparent from Fig. 2a. Between the X-ray source R and the object O disposed at F is arranged a condenser comprising the two rotation surfaces $R^1$cond. and $R^2$cond. This condenser gathers the rays coming from the X-ray source at the point F, that is, at the point where the object is situated. The object is reproduced at F'' by the objective comprising the rotation surfaces $R^1$obj. and $R^2$obj.

Operation without a condenser is, however, possible by advantageously using an X-ray source, as indicated in perspective representation in Fig. 4. In this figure, $h$ is a ring-shaped electron source, preferably an incandescent cylinder which may be provided on the inside with an emitting coating or layer. The anticathode is indicated at $a$. The X-ray source may also be formed as a pure ion tube without cathode heating. The mirror optics may, however, be used with any other X-ray radiation source, including an arc source, which is particularly recommended when it is desired to produce soft X-rays. Radiation which does not contribute to the forming of the image is in each case suitably blanked out, for example, by desired and suitable shutter means, as disclosed in the previously mentioned copending application, so as to reduce disturbing dispersed radiation.

It is clear of course that the mirror optics may also be employed for making reductions of objects by reversing the ray path.

The principle of the mirror optics, as disclosed herein, is also applicable for light rays as well as sound and other types of radiation.

What is believed to be new and desired to have protected by Letters Patent is defined in the appended claims.

I claim:

1. Optical image-forming mirror system for X-rays comprising a plurality of at least two reflecting rotation surfaces having a common rotation axis, said surfaces having a curvature of such small magnitude and being disposed successively along said axis so as to produce solely by mutual cooperation in a defined point of said axis by at least twofold primarily total reflection of X-rays falling thereupon at grazing incidence, a true image of an object disposed at another defined point of said axis.

2. A mirror system as defined in claim 1, wherein said rotation surfaces comprise a rotation hyperboloid and a rotation paraboloid coacting therewith, the focal point of said paraboloid coinciding with the focal point of said hyperboloid, said object being situated at the focal point of said hyperboloid which does not coincide with the focal point of said paraboloid, and said image being situated at infinity.

3. A mirror system as defined in claim 1, which substantially satisfies Abbe's sine condition.

4. A mirror system as defined in claim 1, wherein said surfaces are approximated second-degree surfaces.

5. A mirror system as defined in claim 1, wherein two rotation surfaces have approximately at least one common focal point, the position of said image and said object being respectively determined by focal points which are not common to said rotation surfaces.

6. A mirror system as defined in claim 1, which comprises more than two mirrors formed by rotation surfaces, wherein two successive rotation surfaces have approximately at least one common focus.

7. A mirror system as defined in claim 1, wherein said rotation surfaces comprise a rotation hyperboloid and a rotation ellipsoid coacting with said rotation hyperboloid, one focal point of said ellipsoid coinciding with a focal point of said hyperboloid, the non-coinciding focal points of said hyperboloid and of said ellipsoid determining the respective positions of said image and said object.

8. A mirror system as defined in claim 1, comprising more than two reflecting rotation surfaces of which two successively disposed surfaces have one focal point at least approximately in common, the position of the object being determined by the focal point of the first rotation surface which does not coincide with a focal point of the second rotation surface, and the position of the image being determined by the focal point of the last rotation surface which does not coincide with the focal point of the one-before-last rotation surface.

9. A mirror system as defined in claim 1, wherein said rotation surfaces include a rotation ellipsoid and a rotation hyperboloid of great eccentricity.

10. A mirror system as defined in claim 1, wherein said rotation surfaces are second-degree surfaces, one of said surfaces being deformed to equalize image faults within an appreciable portion of the image field.

11. A mirror system as defined in claim 1, wherein said rotation surfaces are second-degree surfaces, two successive of said surfaces being deformed to equalize image faults within an appreciable portion of the image field.

12. A mirror system as defined in claim 1, especially for use with an X-ray microscope having for the generation of the image-forming rays an X-ray tube having a substantially cone-shaped anticathode on which is formed the focal point, and a cylindrical incandescent cathode surrounding said anticathode, the inside of said incandescent cathode carrying a suitable emitting substance.

References Cited in the file of this patent

UNITED STATES PATENTS

| | | |
|---|---|---|
| 804,996 | Anthony | Nov. 21, 1905 |
| 1,865,441 | Mutscheller | July 5, 1932 |
| 2,053,792 | Huppert et al. | Sept. 8, 1936 |
| 2,198,014 | Ott | Apr. 23, 1940 |
| 2,457,253 | Martin | Dec. 28, 1948 |
| 2,557,662 | Kirkpatrick | June 19, 1951 |
| 2,653,249 | Harker | Sept. 22, 1953 |

OTHER REFERENCES

Formation of Optical Images by X-Rays, by P. Kirkpatrick et al., Journal of the Optical Society of America, September 1948, pp. 766–774.